United States Patent
Lee

(10) Patent No.: US 8,826,862 B2
(45) Date of Patent: Sep. 9, 2014

(54) SUPPORT BEAM FOR PET FURNITURE

(76) Inventor: Chih-Ching Lee, Taipei (TW)

(*) Notice: Subject to any disclaimer, the term of this patent is extended or adjusted under 35 U.S.C. 154(b) by 259 days.

(21) Appl. No.: 13/235,458

(22) Filed: Sep. 18, 2011

(65) Prior Publication Data

US 2013/0068171 A1  Mar. 21, 2013

(51) Int. Cl.
*A01K 1/03* (2006.01)
*A01K 15/02* (2006.01)
*A01K 1/035* (2006.01)
*A47F 5/08* (2006.01)

(52) U.S. Cl.
CPC .............. *A47F 5/0838* (2013.01); *A01K 1/035* (2013.01)
USPC ........ 119/485; 211/94.01; 119/28.5; 119/706

(58) Field of Classification Search
USPC ........ 119/28.5, 174, 416, 421, 482, 484, 485, 119/487, 702, 706, 708; 211/90.01–90.02, 211/94.01–94.02
See application file for complete search history.

(56) References Cited

U.S. PATENT DOCUMENTS

| | | | | |
|---|---|---|---|---|
| 3,425,568 A | * | 2/1969 | Albright | 211/87.01 |
| 4,615,448 A | * | 10/1986 | Johnstonbaugh | 211/94.01 |
| 5,125,518 A | * | 6/1992 | Ward | 211/87.01 |
| 5,138,803 A | * | 8/1992 | Grossen | 52/36.4 |
| 5,228,579 A | * | 7/1993 | Kaufman | 211/94.01 |
| 5,582,376 A | * | 12/1996 | Thompson | 248/214 |
| D404,148 S | * | 1/1999 | Laskowski et al. | D25/123 |
| 5,944,442 A | * | 8/1999 | Roush et al. | 404/26 |
| 6,325,223 B1 | * | 12/2001 | Hannen | 211/87.01 |
| D486,676 S | * | 2/2004 | Campbell et al. | D6/491 |
| 6,763,957 B1 | * | 7/2004 | Mullerleile | 211/94.01 |
| 7,793,450 B2 | * | 9/2010 | Chasmer et al. | 40/657 |
| 8,056,739 B2 | * | 11/2011 | Hopkins | 211/94.01 |
| 8,066,130 B2 | * | 11/2011 | Shaha et al. | 211/90.01 |
| 8,348,070 B2 | * | 1/2013 | Hopkins | 211/94.01 |
| 2006/0180561 A1 | * | 8/2006 | Wisnoski et al. | 211/94.01 |

FOREIGN PATENT DOCUMENTS

TW  M397143  2/2011

OTHER PUBLICATIONS

Li, Zhi-Qing, Translation of Abstract of TW M397143, Feb. 1, 2011.

* cited by examiner

*Primary Examiner* — Rob Swiatek
*Assistant Examiner* — Ebony Evans

(57) ABSTRACT

A support beam for a pet furniture includes a plurality of back plates, first hooks, second hooks and third hooks. Upper end and lower end of the back plate are formed with an insertion slot and a protrusion respectively. One side of the back plate is formed with a plurality of engaging troughs for allowing the first hooks and the third hooks to be disposed therein. The third hook is engaged with the first hook. By this structure, a shelf plate, a cat house and a cat ladder can be mounted onto the back plate by means of the engagement between the second hook and the third hook. Then, the back plate is fixed to a wall. In this way, the support beam for a pet furniture is obtained.

5 Claims, 7 Drawing Sheets

SUPPORT BEAM FOR PET FURNITURE

BACKGROUND OF THE INVENTION

1. Field of the Invention

The present invention relates to a support beam for a pet furniture, and in particular to a modular support beam for a pet furniture, which is capable of adding/removing hanging parts, adjusting its height and location, and changing its occupied area based on practical demands.

2. Description of Prior Art

Animals have their own habits, so that people raise pets in different ways based on the individual habits of the pets. For example, cat likes to jump and climb to a higher position. Further, the cat always seeks through its living space due to natural curiosity. In view of this, the Applicant proposed the Taiwan Patent No. M397143 entitled "Support Beam for Cat House". As shown in FIG. 1, the conventional support beam 1 has a wall plate 10, a plurality of first rails 11, a plurality of second rails 13, and a plurality of hanging parts 12. The wall plate 10 is formed into a rectangular shape and fixed to a wall. The surface of the wall plate 10 is provided with a plurality of troughs 100 for allowing the first rails 11 to be mounted therein. The first rail 11 has a first hook portion 110, and the second rail 13 has a second hook portion 130. The second rail 13 is fixedly connected to one side of the hanging part 12. By means of the engagement between the second rails 13 and the first rails 11, the hanging parts 12 can be hung onto the wall plate 10. By this structure, the support beam 1 can be built in a house or other suitable locations.

In practice, since the wall plate 10 has a rectangular shape, the location where the support beam 1 is built may be restricted by the volume of the surrounding space. Further, the wall plate 1 cannot be made compact, which may affect the external appearance of the whole support beam 1. On the other hand, the conventional support beam 1 cannot allow different kinds of hanging parts 12 to be mounted thereon. Thus, the changeability and functionality of the conventional support beam 1 are limited.

In view of the above, the present inventor proposes a modular support beam for a pet furniture, which is more compact in its structure. Further, the present invention is provided with a plurality of universal engaging troughs for allowing various hanging parts to be mounted therein, which improves the external appearance and visual effect of the whole support beam than prior art. The present invention improves the utilization ratio of a living space of a pet, but also it can be widely used in other building materials for household or commercial use.

SUMMARY OF THE INVENTION

According to a preferred embodiment of the support beam for a pet furniture of the present invention, it is characterized in that: an upper end and a lower end of a back plate are formed with an insertion slot and a protrusion respectively. One side of the back plate is formed with a plurality of engaging troughs.

According to a preferred embodiment of the support beam for a pet furniture of the present invention, it is characterized in that: a first hook has an upper stopper, a lower stopper and a hook portion.

According to a preferred embodiment of the support beam for a pet furniture of the present invention, it is characterized in that: a second hook has an upper stopper, a lower stopper and a fixing portion.

According to a preferred embodiment of the support beam for a pet furniture of the present invention, it is characterized in that: a third hook has a connecting portion and a fastening portion.

According to a preferred embodiment of the support beam for a pet furniture of the present invention, it is characterized in that: the first hook is engaged with the third hook.

According to a preferred embodiment of the support beam for a pet furniture of the present invention, it is characterized in that: the second hook is configured to allow a shelf plate to be mounted thereon.

According to a preferred embodiment of the support beam for a pet furniture of the present invention, it is characterized in that: the third hook is configured to fixedly hold a cat house and a cat ladder.

The detailed description and technical contents of the present invention will be described in more detail with reference to preferred embodiment thereof shown in the accompanying drawings.

DETAILED DESCRIPTION OF THE INVENTION

Figure 1:
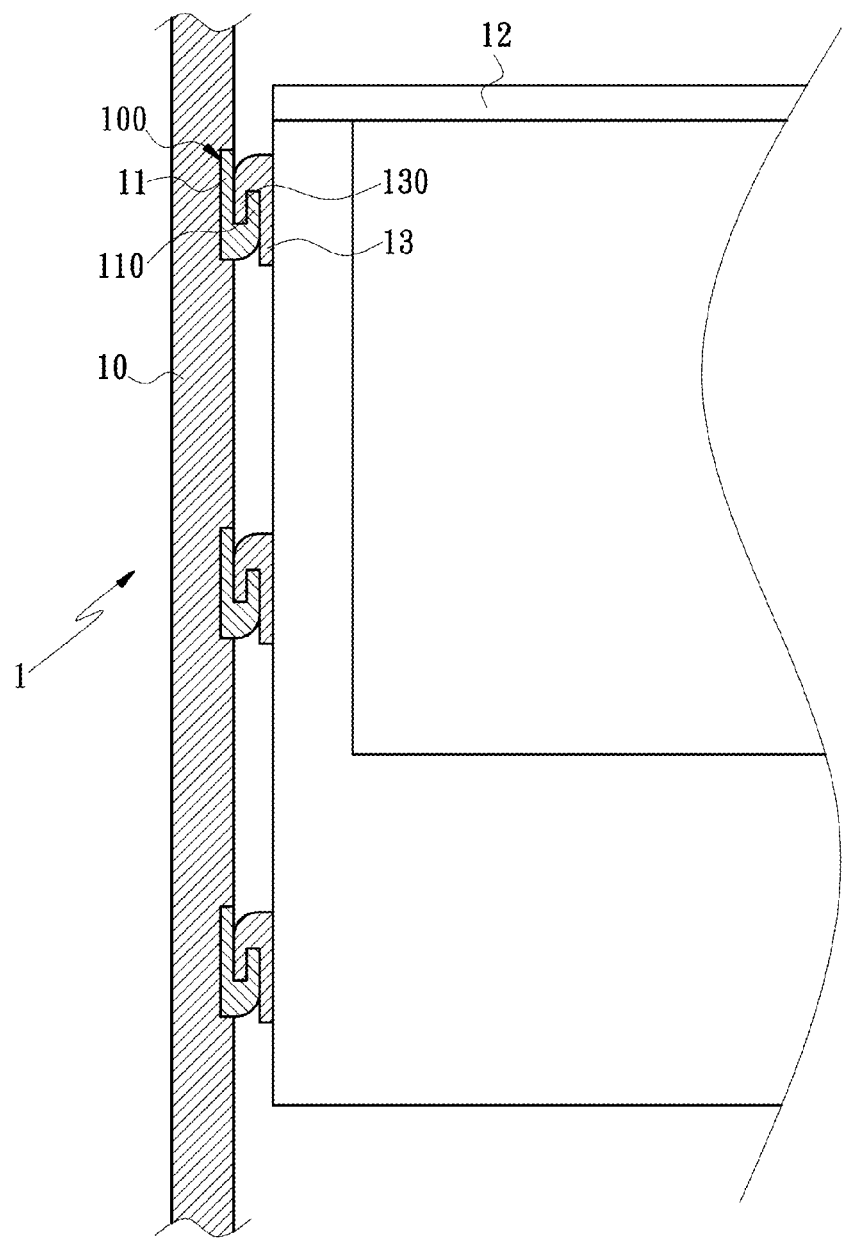
FIG. 1 is a cross-sectional view showing a conventional support beam for a pet furniture.
Figure 2:
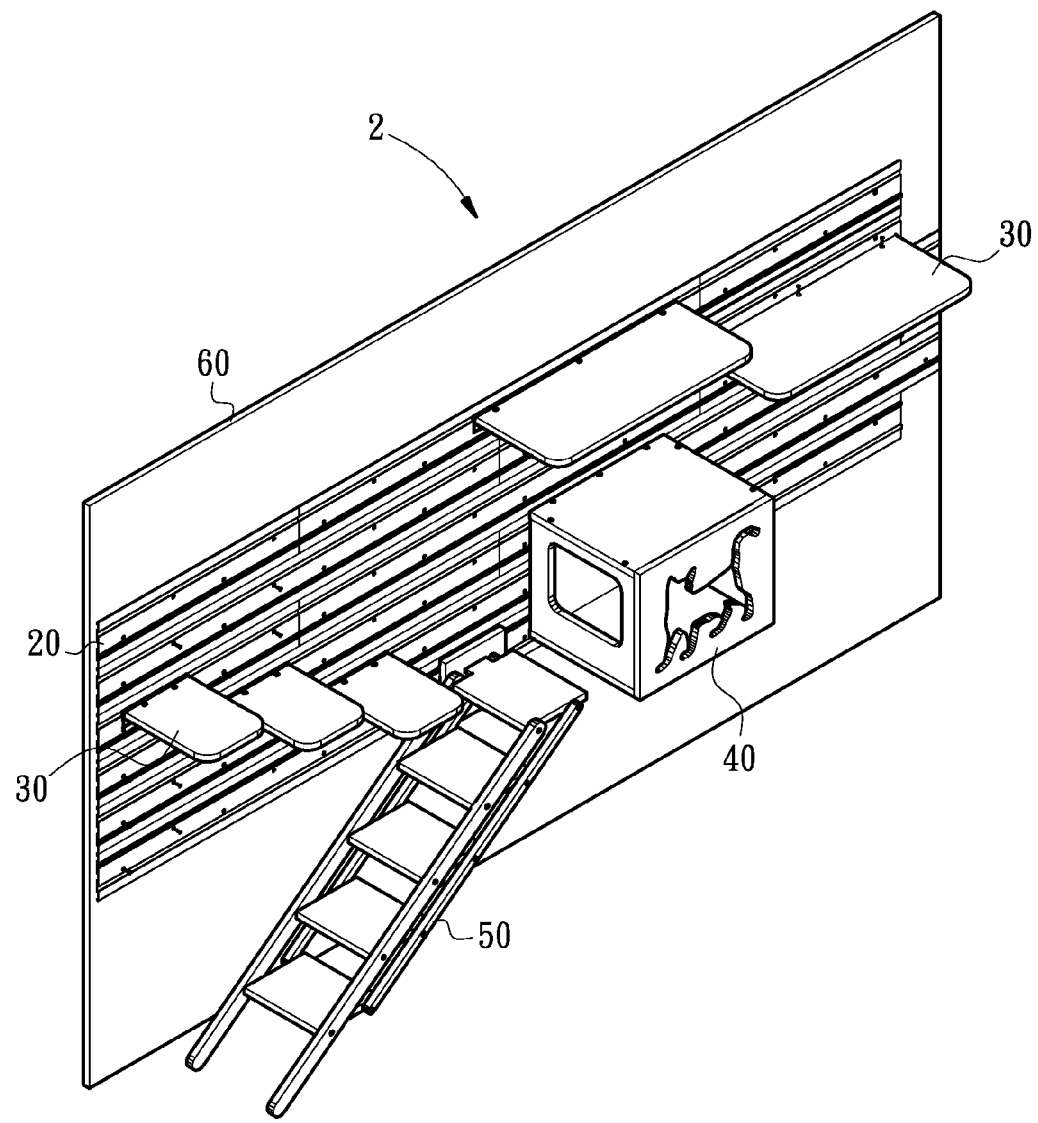
FIG. 2 is a perspective view showing the modular support beam for a pet furniture according to the present invention.
Figure 3:
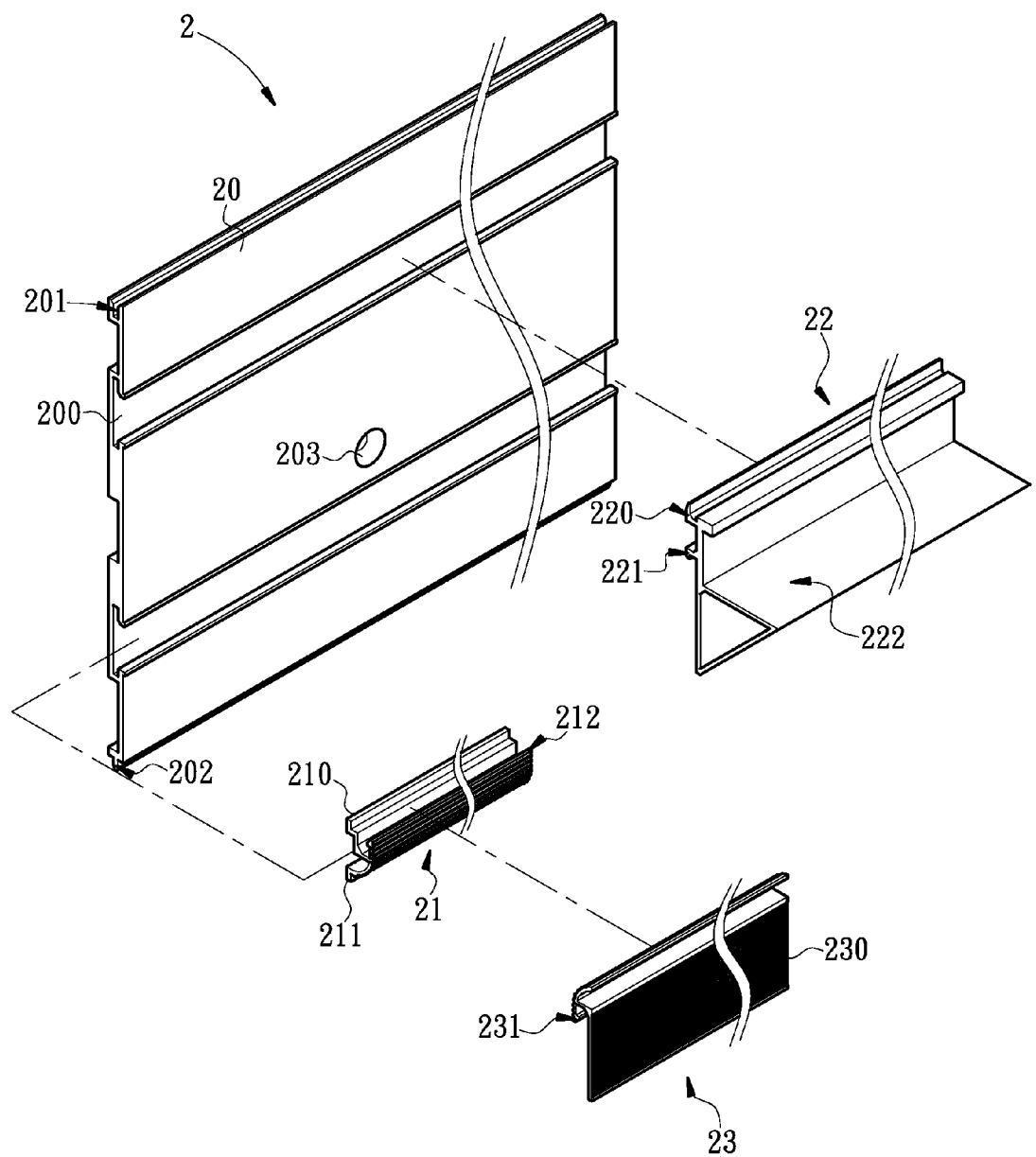
FIG. 3 is an exploded perspective view showing the modular support beam for a pet furniture according to the present invention.
Figure 4:
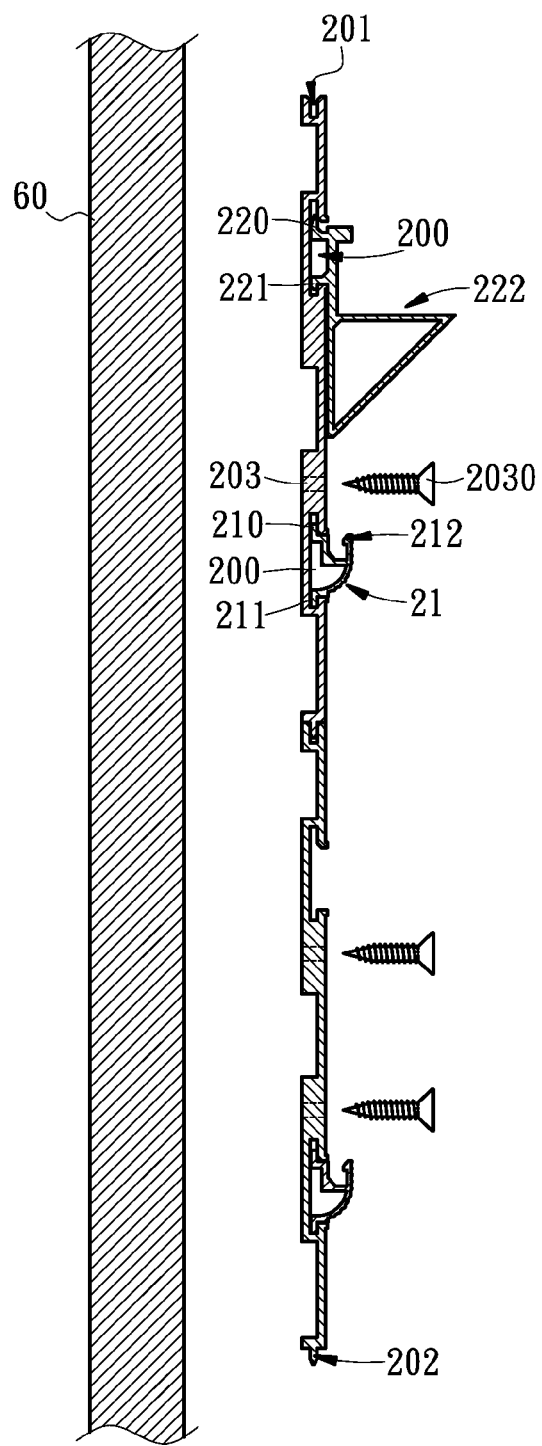
FIG. 4 is a cross-sectional view showing the modular support beam for a pet furniture according to the present invention.

Please refer to FIGS. 2, 3 and 4, which show a preferred embodiment of the modular support beam for a pet furniture according to the present invention. The support beam 1 includes a plurality of back plates 20, a plurality of first hooks 21, a plurality of second hooks 22, and a plurality of third hooks 23. The back plate 20 is formed into a rectangular plate. The top of the back plate 20 is formed with an insertion slot 201. The bottom of the back plate 20 is formed with a rectangular protrusion 202. A vertical surface on one side of the back plate 20 is formed with a plurality of engaging troughs 200. The insertion slot 201 and the protrusion 202 of the back plate 20 allow itself to be engaged with another back plate 20 from its top or bottom. The engaging trough 200 is configured to allow the first hooks 21 and the second hooks 22 to be inserted therein. In addition to the pet furniture, the back plate 20 can be also used to indoor decoration to increase the external appearance and practicability of the whole pet furniture.

The first hook 21 is substantially formed into a semi-curved shape. One end of the first hook 21 is formed with a stepped upper stopper 210 and a lower stopper 211. A curved end of the first hook 21 is formed with a hook portion 212. The upper stopper 210 and the lower stopper 211 of the first hook 21 are disposed into the engaging trough 200 of the back plate 20. The hook portion 212 is configured to correspond to a fastening portion 231 of the third hook 23.

The second hook 22 is substantially formed into a T shape. The top of one side surface of the second hook 22 is formed with an upper end portion 220 and a lower end portion 221. The other side surface of the second hook 22 is formed with a triangular base having a planar fixing portion 222. The upper end portion 220 and the lower end portion 221 of the second hook 22 are disposed into the engaging trough 200 of the back plate 20. The fixing portion 222 is configured to allow a shelf plate 30 to be mounted thereon.

The third hook 23 is substantially formed into a J shape. One vertical side surface of the third hook 23 is formed with a toothed connecting portion 230, and the other end of the third hook 23 is formed with a hooked fastening portion 231. The connecting portion 230 of the third hook 23 is configured to fixedly hold a cat house 40 and a cat ladder 50. The fastening portion 231 is configured to correspond to the hook portion 212 of the first hook 21. By this arrangement, a plurality of back plates 202 can be assembled together in a vertical direction by means of the engagement between the insertion slots 201 and the protrusions 202. Then, a plurality of screws 2030 is used to fix the back plate 20 into a wall 60. The engaging trough 200 of the back plate 20 allows the shelf plate 30, the cat house 40 or the cat ladder 50 to be disposed therein by means of the firm engagement among the first hook 21, the second hook 22 and the third hook 23.

Figure 5:
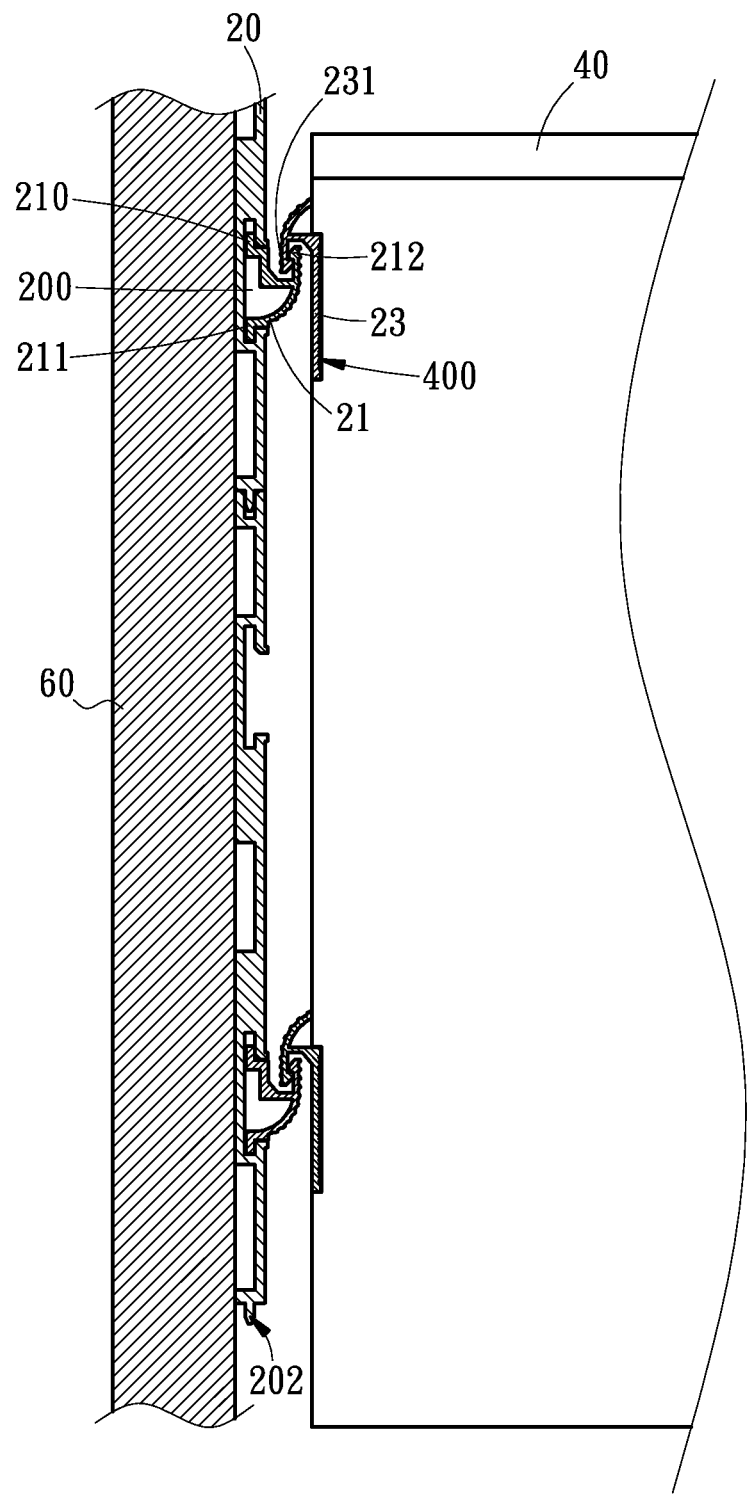
FIG. 5 is a schematic view showing the combination of the modular support beam for a pet furniture according to the present invention and a cat house.
Figure 6:
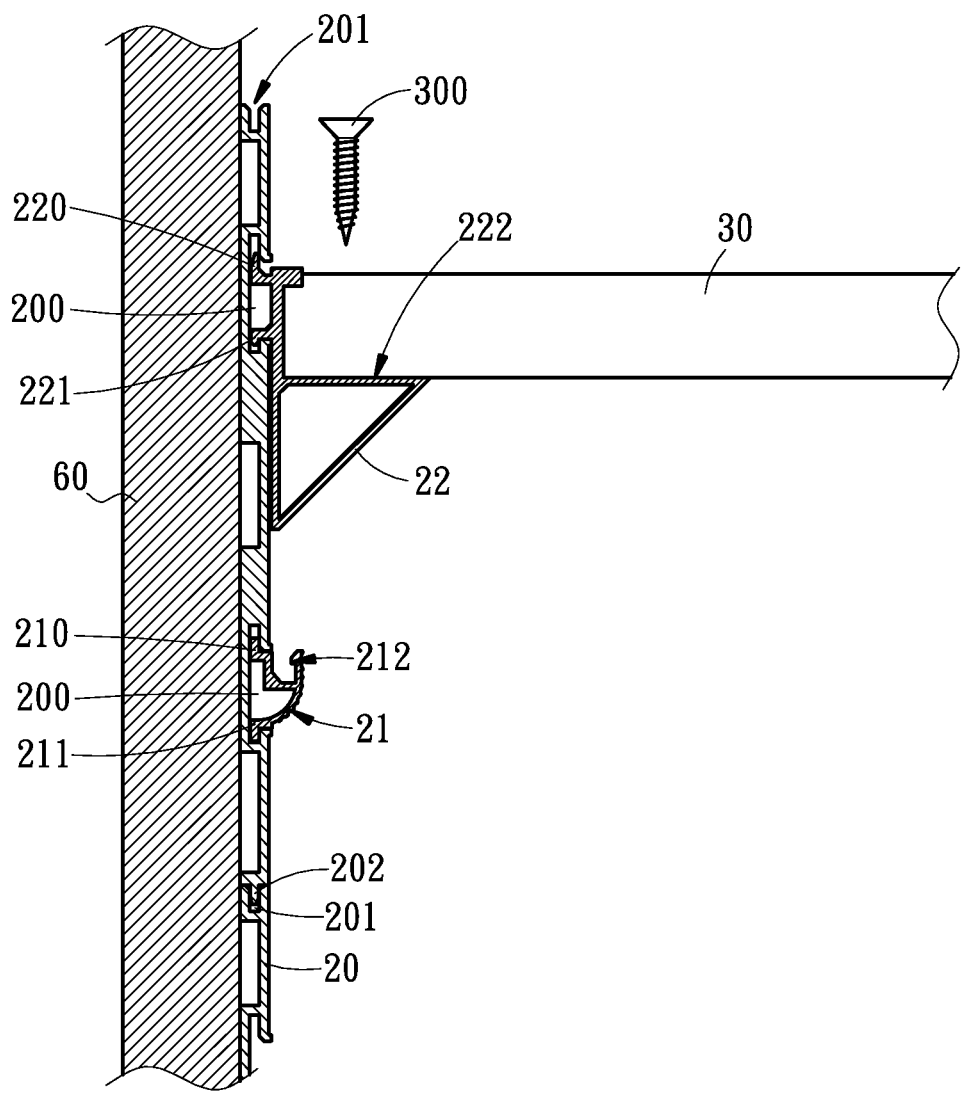
FIG. 6 is a schematic view showing the combination of the modular support beam for a pet furniture according to the present invention and a shelf plate.
Figure 7:
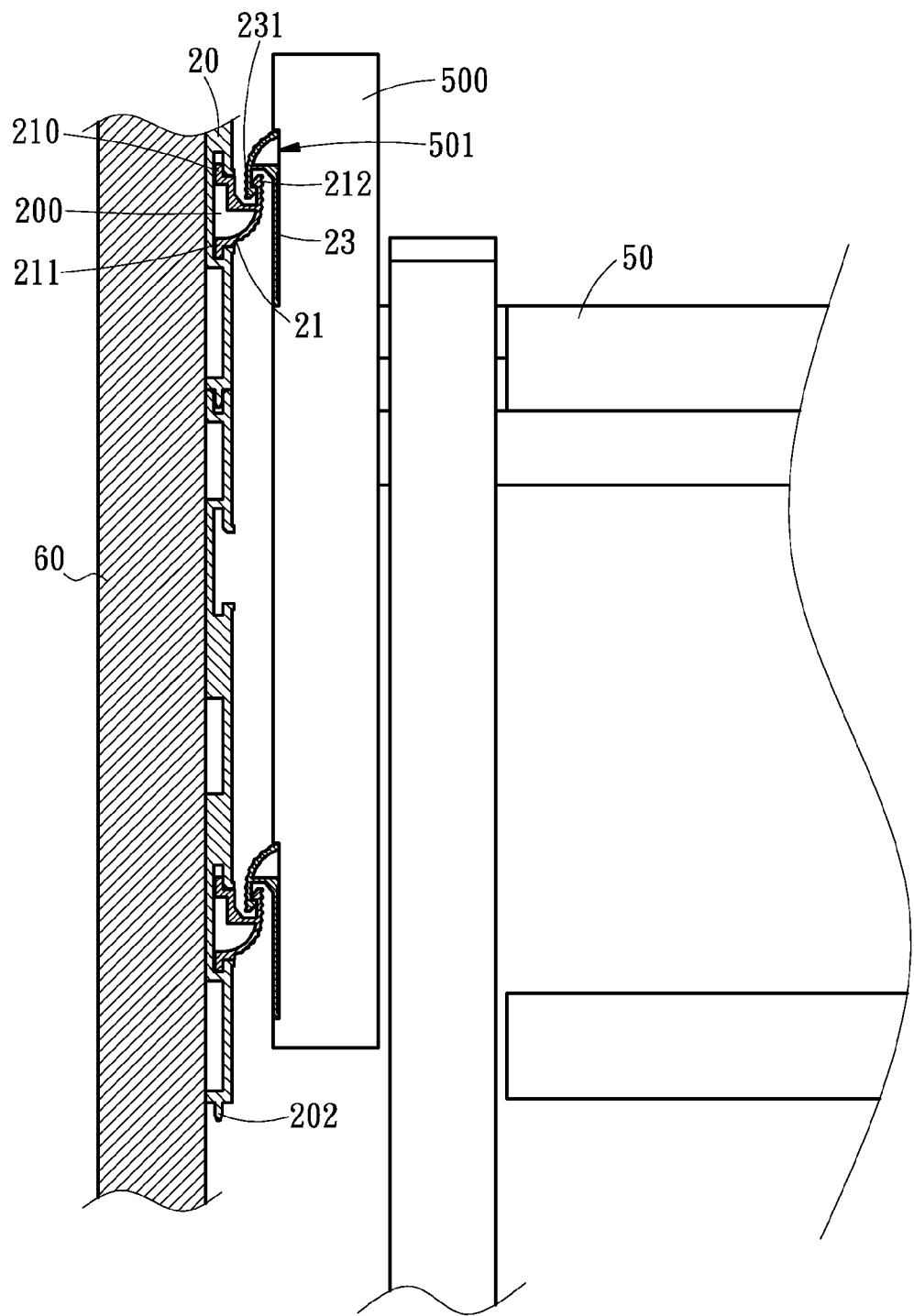
FIG. 7 is a schematic view showing the combination of the modular support beam for a pet furniture according to the present invention and a cat ladder.

Please refer to FIGS. 5, 6, and 7, which show that a hanging part is mounted on the back plate 20. As shown in FIG. 5, the back plate 20 is fixed to the wall 60 and the cat house 40 is mounted on the back plate 20. The plurality of first hooks 21 is disposed in the engaging trough 200 of the back plate 20. The third hook 23 is connected to the first hook 21 for holding the cat house 40. One side of the cat house 40 is formed with an insertion slot 400 for allowing the third hook 23 to be disposed therein. After the third hook 23 is combined with the cat house 40, the fastening portion 231 of the third hook 23 is disposed in the hook portion 212 of the first hook 21, whereby the cat house 40 can be mounted onto the back plate 20.

FIG. 6 shows that the shelf plate 30 is mounted onto the back plate 20. After the back plate 20 is fixed to the wall 60, the second hook 22 is disposed into the engaging trough 200 of the back plate 20, whereby the shelf plate 30 can be mounted onto the back plate 20. The upper stopper 220 and the lower stopper 221 of the second hook 22 are inserted into the engaging trough 200. Then, a plurality of screws 300 is used to fix the shelf plate 30 to the fixing portion 222 of the second hook 22. The width of the shelf plate 30 can be changed based on practical demands.

FIG. 7 shows that a cat ladder is mounted onto the back plate 20. After the back plate 20 is fixed to the wall 60, a plurality of first hooks 21 are disposed in the engaging trough 200 of the back plate 20, whereby the cat ladder 50 can be mounted onto the back plate 20. The third hook 23 is used to connect the cat ladder 50. One side of the cat ladder 50 is connected with at least one fixing plate 500. A corresponding third hook 23 is disposed on one side of each fixing plate 500. By means of the combination between the third hooks 23 and the fixing plates 500 of the cat ladder 50, the fastening portion 231 of each third hook 23 is disposed into the hook portion 212 of a corresponding first hook 21, whereby the cat ladder 50 can be mounted onto the back plate 20.

According to the above, different hanging parts such as the shelf plate 30, the cat house 40 and the cat ladder 50 can be mounted onto the back plate 20. Further, the support beam 1 has a modular structure including the back plate 20, the first hooks 21, the second hooks 22 and the third hooks 23, so that different hanging parts can be mounted onto the back plate 20. On the other hand, the support beam 1 can be mounted on the wall with different widths to meet various needs.

What is claimed is:

1. A support beam for pet furniture, including:
   a back plate formed into a rectangular plate and fixable on a wall, a first end of the back plate being formed with an insertion slot, an opposing second end of the back plate being formed with a rectangular protrusion, a vertical surface of the back plate having at least an engaging trough, each engaging trough including an upper groove and a lower groove, the insertion slot and the protrusion of the back plate being configured to matingly connect to another back plate vertically;
   a first hook comprising a first portion connected to a second portion, the first portion of the first hook being formed in a stepped shape with an upper stopper for engaging with the upper groove of the at least an engaging trough, the second portion having a curved section, an end of the curved section having a hook portion, and an opposing end of the curved section having a lower stopper for engaging with the lower groove of the engaging trough;
   a second hook comprising a horizontal portion substantially perpendicularly connected to a first side of a vertical portion, an opposing second side of the vertical portion comprising an upper stopper and a lower stopper, the first side of the vertical portion further comprising a triangular base having a fixing portion, the triangular base disposed below the horizontal portion and configured to accept a shelf plate, the upper stopper and the lower stopper being configured to respectively engage with the upper groove and the lower groove of the engaging trough of the back plate; and
   a third hook comprising a first portion connected to a second portion, the first portion comprising a vertical surface for engaging with another object, the second portion being curved and having a first end disposed above the vertical surface of the first portion and an opposing end having a hooked fastening portion configured to engage the hook portion of the first hook.

2. The support beam for a pet furniture according to claim 1, wherein a width of the shelf plate is changeable.

3. The support beam for a pet furniture according to claim 1, wherein the vertical surface of the third hook is configured to engage a cat house and a cat ladder for mounting thereon.

4. The support beam for a pet furniture according to claim 3, wherein the cat ladder further comprises a plurality of fixing plates each having an insertion slot.

5. The support beam for a pet furniture according to claim 3, wherein a side of the cat house is formed with a plurality of insertion slots configured to accept the vertical surface of the third hook.

* * * * *